United States Patent
Sommese et al.

(10) Patent No.: US 6,280,631 B1
(45) Date of Patent: *Aug. 28, 2001

(54) USE OF POLYMERS CONTAINING VINYLAMINE/VINYLFORMAMIDE FOR THE TREATMENT OF FOOD PROCESSING WASTEWATER

(75) Inventors: Anthony G. Sommese, Naperville, IL (US); Daniel K. Chung, Burlington (CA)

(73) Assignee: Nalco Chemical Company, Naperville, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/364,589

(22) Filed: Dec. 27, 1994

(51) Int. Cl.$^7$ .................................................. C02F 1/56
(52) U.S. Cl. ........................... 210/727; 210/733; 210/734; 210/735; 210/905
(58) Field of Search .................................. 210/705, 725, 210/727, 728, 733, 734, 735, 736, 904

(56) References Cited

U.S. PATENT DOCUMENTS

| | | | |
|---|---|---|---|
| 3,715,336 * | 2/1973 | Nowak et al. | 210/735 |
| 4,013,555 * | 3/1977 | Davis | 210/725 |
| 4,444,667 * | 4/1984 | Burkert et al. | 210/735 |
| 5,174,903 * | 12/1992 | Miller | 210/725 |
| 5,185,083 * | 2/1993 | Smigo et al. | 210/735 |
| 5,204,007 * | 4/1993 | Mosley et al. | 210/705 |
| 5,225,088 * | 7/1993 | Moench et al. | 210/734 |
| 5,292,441 * | 3/1994 | Chen et al. | 210/735 |
| 5,324,792 * | 6/1994 | Ford | 525/378 |
| 5,429,749 * | 7/1995 | Chung et al. | 210/727 |
| 5,435,921 * | 7/1995 | Collins et al. | 210/727 |
| 5,441,649 * | 8/1995 | Sommese et al. | 210/735 |
| 5,451,326 * | 9/1995 | Carlson et al. | 210/708 |
| 5,476,594 * | 12/1995 | Collins et al. | 210/734 |

* cited by examiner

*Primary Examiner*—Peter A. Hruskoci
(74) *Attorney, Agent, or Firm*—Michael B. Martin; Thomas M. Breininger

(57) ABSTRACT

The present invention provides a method for conditioning food processing waste prior to mechanical dewatering with the use of environmentally friendly coagulants and flocculants. The method of the present invention comprises treating these waste waters with an effective amount of a vinylamine polymer including from about 1 to about 100 mole percent vinylamine and from about 1 to about 99 mole percent of at least one monomer selected from the group consisting of amidine, vinylformamide, vinyl alcohol, vinyl acetate, vinyl pyrrolidinone and the esters, amides, nitriles and salts of acrylic acid and methacrytic acid. In an embodiment, the method of the present invention includes the further step of adding an effective amount of at least one flocculant to the food processing waste. The flocculent effectively agglomerates a portion of the colloidal organic solids into suspended solids.

5 Claims, No Drawings

USE OF POLYMERS CONTAINING VINYLAMINE/VINYLFORMAMIDE FOR THE TREATMENT OF FOOD PROCESSING WASTEWATER

BACKGROUND OF THE INVENTION

1. Field of the Invention

The present invention relates generally to the treatment of food processing wastewater. More particularly, the present invention provides a chemical treatment method that effectively removes fat, blood, tissue and other solids from food processing wastewater.

2. Description of the Prior Art

Everyday the food processing industry produces many tons of food processing waste. Such food processing waste contaminates the water stream flowing through the food processing system. For example, poultry farm waste water effluents are enriched with fat, oil, blood and other solids from the poultry process. These by-products, such as fat, blood, and tissue, are typically present in the waste water in a range of several hundred to tens of thousands of ppm.

For economic as well as regulatory reasons, the food processing community faces never-ending concerns regarding the disposal and recycling of food processing waste water. The removal of such by-products is critical from an environmental standpoint. In fact, the United States Environmental Protection Agency has placed tight restrictions on total oil and solids content in water that is be discharged into public drinking water supplies or into open bodies of water.

The removal of such solids is also critical to the established discharge limits for total dissolved solids (TDS), chemical oxygen demand (COD), biological oxygen demand (BOD) and total organic carbon (TOC) into local sewers and rivers. In addition to the EPA's severe discharge limits, food processing industries must also be concerned with local city ordinances.

As an alternative to discharging treated water into a water stream or the like, recycling of the water back into the processing system provides a cost efficient system. However, in order to recycle such waste water, the solids content and so forth must be effectively removed in order to provide pure water back into the system. Accordingly, the same concerns that are present with respect to the removal of such solids for EPA standards exist for recycling purposes as well.

Therefore, a need exists for a treatment system that addresses all the environmental concerns presented by food processing waste, while at the same time being environmentally friendly.

SUMMARY OF THE INVENTION

The present invention provides a method for conditioning food processing waste prior to mechanical dewatering with the use of environmentally friendly coagulants and flocculants. The method of the present invention comprises treating these waste waters with an effective amount of a vinylamine polymer including from about 1 to about 100 mole percent vinylamine and from about 1 to about 99 mole percent of at least one monomer selected from the group consisting of vinylformamide, vinyl alcohol, vinyl acetate, vinyl pyrrolidinone and the esters, amides, nitrites and salts of acrylic acid and methacrylic acid.

In an embodiment, the method of the present invention includes the further step of adding an effective amount of at least one flocculant to the food processing waste. The flocculant effectively agglomerates a portion of the colloidal organic solids into suspended solids.

DETAILED DESCRIPTION OF THE PREFERRED EMBODIMENTS

The present invention provides, for conditioning food processing waste, a method that includes the addition of a vinylamine polymer coagulant to the food processing waste. The invention provides a superior method for removing fat, blood, tissue, and the like from food processing waste. The vinylamine polymers of the present invention have been discovered to be more effective in removing such products from food processing waste and appear to be less than currently available chemical treatments. The invention comprises treating these waste waters with an effective amount of a water soluble polymer containing from about 1 to about 99 mole percent vinylamine monomer and/or a monomer hydrolyzable to vinylamine, and/or from 1–99 mole percent of amidine, vinylformamide, vinyl alcohol, vinyl acetate, vinyl pyrrolidinone or the esters, amides, nitrile and salts of acrylic acid and methacrylic acid monomer.

For purposes of this invention, vinylamine monomers include vinylamine and those monomers which are hydrolyzable to the following formula:

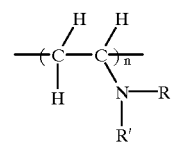

wherein: R and R' are, preferably, one substituent group selected from the group consisting of hydrogen and an alkyl group having from 1–10 carbon atoms. More preferably, R is hydrogen or is an alkyl group having 1–4 carbons.

The vinylformamide monomer of the invention is non-hydrolyzed and has the following structure:

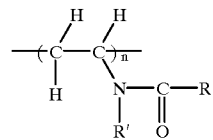

wherein: R and R' are, preferably, one substituent group selected from the group consisting of hydrogen and an alkyl group having from 1–10 carbon atoms. More preferably, R is hydrogen or is an alkyl group having 1–4 carbons.

The amidine moiety, derived from the amine hydrolysis of polyvinyl formamide has the following structure:

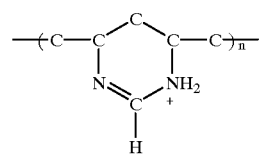

According to one embodiment of the invention, the polymers of the invention include a vinylamine/vinyl alcohol copolymer. Preferably, the copolymer will include from about 1 to about 99 mole % vinylamine and about 1 to about 99% vinyl alcohol. More preferably, the copolymer will include from about 2 to about 50 mole % vinyl alcohol and from about 98 to about 50 mole % vinylamine. Most preferably, the vinyl alcohol is included in the copolymer in an amount of from about 10 to about 20 mole % and the vinylamine is included in an amount of from about 90 to about 80 mole %.

According to a further embodiment of the invention, the polymer composition includes vinylamine/vinylformamide copolymer. Preferably, the copolymer includes from about 1 to about 99% vinylamine and from about 1 to about 99% vinylformamide. More preferably, the copolymer includes from about 2 to about 50% vinylamine and from about 98 to about 50% vinylformamide. Most preferably the coagulants include 60–80% vinylamine and 40–20% vinylformamide.

According to a further embodiment of the invention, the polymer composition includes a vinylamine/vinylformamide/amidine terpolymer (A/B/C) in monomer ranges of: A 15–90%; B 5–60%; and C 5–60%. Most preferably the monomer range is about 65/5/30, respectfully.

Processes for making the polymers of the invention are well known in the art. U.S. Pat. Nos. 5,126,395, 5,037,927, 4,952,656, 4,921,621, 4,880,497 and 4,441,602 all describe methods for preparing the polymers of the invention. Solution polymerization produces the desired molecular weight dosage. The resulting vinylformamide homopolymers are susceptible to alkaline or acid hydrolysis which converts some or all of the amide groups to amine groups. These U.S. patents all describe methods for preparing the polymers of the invention. Hydrolysis of the amide groups to yield the amine can be achieved by using acid or base. By controlling the stoichiometry of the hydrolyzing agent it is possible to produce vinylamine/vinylformamide copolymers of varying composition. If vinylformamide is polymerized with other ethylenically unsaturated monomers, then hydrolyzed, it is conceivable that the polymer produced will contain at least three and possibly more functional groups. Cyclic amidine is produced by ammonia or amine hydrolysis of polyvinyl-formamide.

Preferably, the vinylamine polymers of the invention have an average molecular weight of from about 10,000 to 3,000,000. More preferably, the molecular weight is from about 250K to about 2 million. Vinylamine polymers having molecular weights from about 500K to 2 million are the most preferred in treatments performed in accordance with this invention.

Generally, the dosage, based on active polymer, will be from about 0.001 to about 1,000 ppm by weight of the waste water treated. More preferably, the dosage range is between 0.01 to about 100 ppm; and most preferably, from about 1 to about 50 ppm.

In an embodiment, the method of the present invention includes the further step of adding an effective amount of a flocculant to the food processing waste. The flocculant component of the present invention leads to the direct agglomeration of colloidal organic solids to suspended solids. The active flocculant increases the settlement rate and facilitates flocculation. In addition, the floccuent component promotes co-precipitation of dissolved solids onto the suspended solids template, reducing soluble biological and chemical oxidation demands of the final treated effluent.

Examples of suitable flocculants that may be used in the present invention include: i.e. copolymers of acrylamide and the esters, amides and salts of acrylic acid, polyacrylic acid.

Pursuant to the method of the present invention, food processing waste can be purified and an environmentally friendly water is simultaneously obtained. In an embodiment, the method of the present invention involves the addition of at least one vinylamine polymer coagulant to the food processing waste. While the sole addition of the polymer coagulant effectively conditions the food processing waste prior to mechanical dewatering, the combined addition of a coagulant and flocculent provides a more complete treatment.

The optimal amounts of the various components required for effectiveness in this invention depend on the type of food processing waste being treated. In addition, the concentration of the combined components varies greatly and can depend upon the conditions such as temperature, pH and the amount of suspended solids the food processing waste.

The vinylamine coagulants of the present invention can be applied to food processing waste slurry, stored or screened solids, or to filtrate produced by dewatering. In an embodiment, the polymer is directly injected into the food processing waste. The polymer may be added with or without a dilution system. The polymers of the invention are preferably added to the system in neat form. However, in some applications, the polymers can be added as an aqueous solution. The active polymer facilitates optimal dewatering of solids as well as optimal clarification of filtrate liquors.

Once the polymers of the invention are added to the waste water stream, the treated water is naturally agitated as it moves through the process stream of the food processing plant. The polymers of the invention will cause the fat, blood, tissue and the like to coagulate from the water. The coagulant is subsequently flocculated and removed from the surface of the water and handled further. The treated water can now be discharged either into a river, lake or recycled into an industrial process.

As stated above, for a complete chemical treatment system, a flocculant may also be added to the food processing waste water. In an embodiment, the flocculant component of the present invention is added in an effective amount of from 0.01 to 1,000 ppm.

The results for each set of testing are discussed individually below in respective examples. The chemical treating agents were added at the listed dosages. All Nalco designated products are available from Nalco Chemical Company, Naperville, Ill. Other commercial products are available as designated.

EXAMPLES 250 ml of wastewater in a 400 ml beaker was dosed with coagulant and stirred for 2.5 minutes at 300 rpm. Then, the flocculant was added in one portion and stirred at 300 rpm for 30 seconds. The stirring rate was reduced to 25 rpm and the solution stirred for 2 minutes. After stirring, the solution was allowed to stand for 2 minutes, then an aliquot was removed and its turbidity measured.

Example 1

Polymers Tested

Coagulants

A. EPI-DMA 300–500K

B. Polyvinylamine 300–500K

C. Polyvinylamine 800K–2M

D. Vinylamine/vinylformamide 50/50, 800K–2M

E. Vinylamine/vinylformamide 30/70, 800K–2M

F. 12/88 Vinylamine/vinylalcohol 100–200K

Flocculants

G. Acrylamide/Sodium acrylate, RSV 20–35

H. Sodium polyacrylate RSV 20–35

A Midwestern Chicken Processing Facility
Initial Turbidity>1000 NTU

| COAGULANT (ppm) | FLOCCULANT (ppm) | TURBIDITY (NTU) |
|---|---|---|
| A | G | |
| 4 | 12 | 72.7 |
| 8 | 12 | 27.7 |
| 16 | 12 | 15.7 |
| 20 | 12 | 14.0 |
| 40 | 12 | 57.0 |
| 60 | 12 | 89.0 |
| B | H | |
| 20 | 16 | 410 |
| 40 | 16 | 364 |
| 60 | 16 | 358 |
| 80 | 16 | 313 |
| C | H | |
| 4 | 12 | 80.0 |
| 8 | 12 | 44.0 |
| 16 | 12 | 35.0 |
| 20 | 12 | 10.0 |
| 40 | 12 | 38.0 |
| 60 | 12 | 63.0 |
| D | H | |
| 4 | 12 | 84.0 |
| 8 | 12 | 53.0 |
| 16 | 12 | 33.0 |
| 20 | 12 | 40.0 |
| 30 | 12 | 71.0 |
| 40 | 12 | 196.0 |

In all cases the polymer package produced flocs that were readily floated in a DAF unit.

Example 2

Polymers Tested
  Coagulants
  B. Polyvinylamine 300–500K
  C. Polyvinylamine 800K–2M
  D. vinylamine/vinylformamide 50/50, 800K–2M
  E. Vinylamine/vinylformamide 30/70, 800K–2M
  F. 12/88 Vinylamine/.vinylalcohol 100–200K
  Flocculants
  G. Acrylamide/Sodium acrylate, RSV 20–35
  H. Sodium polyacrylate RSV 20–35

A Southwestern Hog Processing Facility
Initial Turbidity>1000 NTU

| COAGULANT (ppm) | FLOCCULANT (ppm) | TURBIDITY (NTU) |
|---|---|---|
| B | H | |
| 25 | 12.5 | 122.0 |
| 75 | 12.5 | 184.0 |
| C | H | |
| 25 | 12.5 | 32.9 |
| 50 | 12.5 | 33.9 |
| 75 | 12.5 | 39.1 |
| E | H | |
| 25 | 12.5 | 39.0 |
| 50 | 12.5 | 25.3 |
| 75 | 12.5 | 80.6 |
| F | H | |
| 25 | 12.5 | 181.0 |
| 75 | 12.5 | 113.0 |

Example 3

Polymers Tested
  Coagulants
  A. EPI-DMA 300–500K
  B. Polyvinylamine 300–500K
  C. Polyvinylamine 800K–2M
  D. Vinylamine/vinylformamide 50/50, 800K–2M
  E. Vinylamine/vinylformamide 30/70, 800K–2M
  F. 12/88 Vinylamine/Vinylalcohol 100–200K
  Flocculants
  G. Acrylamide/Sodium acrylate, RSV 20–35
  H. Sodium polyacrylate RSV 20–35

A Midwestern Beef Processing Facility
Initial Turbidity>1000 NTU

| COAGULANT (ppm) | FLOCCULANT (ppm) | TURBIDITY (NTU) |
|---|---|---|
| B | H | |
| 25 | 12.5 | 141.0 |
| 50 | 12.5 | 126.0 |
| 75 | 12.5 | 118.0 |

Example 4

Polymers Tested
  Coagulants
  A. EPI-DMA 300–500K
  B. Polyvinylamine 300–500K
  C. Polyvinylamine 800K–2M
  D. Vinylamine/vinylformamide 50/50, 800K–2M
  E. Vinylamine/vinylformamide 30/70, 800K–2M
  F. 12/88 Vinylamine/.vinylalcohol 100–200K
  Flocculants
  G. Acrylamide/Sodium acrylate, RSV 20–35
  H. Sodium polyacrylate RSV 20–35

A Midwestern Grain Processing Facility
Initial Turbidity>1000 NTU

| COAGULANT (ppm) | FLOCCULANT (ppm) | TURBIDITY (NTU) |
|---|---|---|
| B | | |
| 10 | 0 | 33.5 |
| 30 | 0 | 34.8 |
| 50 | 0 | 29.1 |

-continued

| COAGULANT (ppm) | FLOCCULANT (ppm) | TURBIDITY (NTU) |
|---|---|---|
| C | | |
| 10 | 0 | 35.5 |
| 30 | 0 | 24.0 |
| 50 | 0 | 27.0 |
| C | H | |
| 10 | 12.5 | 27.9 |
| 50 | 12.5 | 23.2 |
| F | | |
| 10 | 0 | 25.0 |
| 30 | 0 | 27.4 |
| 50 | 0 | 33.0 |

What is claimed is:

1. A method for clarifying food processing waste water containing suspended solids including fat, blood, and tissue comprising the step of treating the food processing waste water with an effective amount of at least one vinylamine polymer having a molecular weight of at least 500,000, wherein the vinylamine polymer is prepared by first polymerizing N-vinylformamide to form a vinyl formamide polymer and then subjecting the vinyl formamide polymer to acid or base hydrolysis to form the vinylamine polymer adding polymeric flocculant selected from the group consisting of acrylamide/sodium acrylate and sodium acrylate, to the waste water, coagulating and flocculating the suspended solids, and separating the coagulated and flocculated suspended solids from the waste water.

2. The method of claim 1 wherein the effective amount of the vinylamine polymer added to the food processing waste is from about 0.001 to about 1000 parts per million of the wastewater treated.

3. The method of claim 2 wherein the effective amount of the vinylamine polymer added to the food processing waste is about 0.01 to 100 parts per million.

4. The method of claim 1 wherein the effective amount of the vinylamine polymer added to the food processing waste is 1 to 50 parts per million.

5. The method of claim 1 where the waste water is derived from the group consisting of poultry, pork, and beef effluent waters.

* * * * *